2,839,377

DEFLUORINATION OF PHOSPHATE ROCK

Clinton A. Hollingsworth, Lakeland, Fla., and John C. Williams, Catasauqua, Pa., assignors, by mesne assignments, to Smith-Douglass Company, Incorporated, Norfolk, Va., a corporation of Virginia No Drawing. Application February 28, 1951
Serial No. 213,284

4 Claims. (Cl. 71—45)

This invention relates to the defluorination of phosphate rock and similar natural phosphate materials, and has for its object the provision of an improved method of defluorinating such materials by calcination.

The principal difficulty encountered in the defluorination of phosphate rock by calcination arises from the fact that the temperature required for the removal of fluorine is so near the fusion temperature of the rock that objectionable fusion or sintering takes place before the removal of fluorine to the desired extent is effected. Hence, it is not practical to operate at the optimum defluorinating temperature unless some means is provided to prevent fusion at that and somewhat higher temperatures, because at times the operating temperature (particularly in a rotary kiln) will inadvertently rise above the fusion temperature. It has long been recognized that silica and water vapor aid defluorination, but silica in excess of about 4% and up to about 30% lowers the fusion temperature of the calcining charge. It has further been recognized that alkali compounds (e. g. sodium carbonate) and phosphoric acid exert some beneficial effect upon defluorination, but these reagents too, like silica, tend to lower the fusion temperature when present in amounts contributing beneficially to fluorine removal.

In an extensive investigation of the effects of silica, phosphoric acid and alkali compounds in promoting the removal of fluorine from phosphate rock and in influencing the fusion temperature of the calcining charge, we have determined that by properly proportioning the relative amounts of the three reagents included in the calcining charge, and with due consideration of the grade ($P_2O_5$ content) and lime (CaO) content of the phosphate material, substantially complete defluorination can be effected by calcination in kilns of commercial size without objectionable fusion or sintering of the calcining charge. The present invention accordingly involves defluorinating phosphate rock by calcination at a temperature of at least 2600° F. without substantial fusion in the presence of water vapor and of a reagent mixture consisting essentially of the reaction product of phosphoric acid and sodium carbonate, with a mol ratio of $Na_2O$ to $P_2O_5$ in the reaction product between 1.6 and 2.8, and with such relative amounts of CaO, $Na_2O$, $P_2O_5$ and $SiO_2$ in the combined phosphate rock and reagent mixture that the mol ratio of these constituents is between 1.3 and 2.8 in the formula $$\frac{\text{Mols } CaO + Na_2O - 3P_2O_5}{\text{Mols } SiO_2}$$

More particularly, the method of the invention involves reacting sodium carbonate with an aqueous solution of phosphoric acid in such proportions that the mol ratio of $Na_2O$ to $P_2O_5$ in the reaction product is between 1.6 and 2.8, and such amount of the reaction product is mixed with the phosphate rock (containing from 2 to 6% of silica) that the calcining charge is made up of from 5 to 15% by weight of added $Na_2O$ and $P_2O_5$ in the form of the reaction product and the balance (95–85% by weight on a dry basis) of the phosphate rock.

In practicing the invention in a rotary kiln, the phosphate rock is introduced into the feed or cold end of the kiln along with the reagent mixture in the form of the reaction product resulting from reacting sodium carbonate with an aqueous solution of phosphoric acid. Commercial light soda ash having a $Na_2O$ content of about 58% (over 98% $Na_2CO_3$) is a satisfactory form of sodium carbonate. Crude commercial phosphoric acid resulting from reacting sulphuric acid with a phosphate-bearing material, e. g. phosphate rock, is a satisfactory form of phosphoric acid. Conveniently, a predetermined amount of commerical soda ash is dissolved in a predetermined amount of water in a suitable reaction tank, and a predetermined amount of an aqueous solution of crude phosphoric acid is then run into the reaction tank with constant stirring and in such gradual quantities as to avoid objectionable foaming. The reaction product may advantageously be run into the feed or cold end of the kiln and mixed there with the rock by the tumbling action resulting from the rotation of the kiln. The phosphate rock customarily contains 10 to 14% of moisture, and such additional amount of water may advantageously be introduced into the kiln, along with the rock and reagent mixture, as to form at the cold end of the kiln a slurry containing from 30 to 40% of water.

In the present preferred practice of the invention, the calcining charge is made up approximately 94–93% by weight of phosphate rock (on a dry basis) and approximately 6–7% by weight of added $Na_2O$ and $P_2O_5$ in the form of the reaction product in which the mol ratio of $Na_2O$ to $P_2O_5$ is approximately 2.3. With a phosphate rock containing about 35% $P_2O_5$, about 50% CaO and from 4 to 5% of silica (generally determined as "insoluble matter" in the phosphate industry), the mol ratio of the constituents of the calcining charge represented by the formula:

$$\frac{\text{Mols } CaO + Na_2O - 3P_2O_5}{\text{Mols } SiO_2}$$

will then be approximately 1.6 to 2.0. In practice, it is frequently more convenient to determine and express the ratio of $Na_2O$ to $P_2O_5$ in the reaction product in actual weight, and in such case a mol ratio of approximately 2.3 corresponds to a weight ratio of $Na_2O$ to $P_2O_5$ of approximately 1. On a weight basis, our present preferred calcining charge, as fed to the kiln, is made up as follows:

| | Percent by weight |
|---|---|
| Phosphate rock (on a dry basis) | 93.0 |
| $Na_2O$ (added) | 3.4 |
| $P_2O_5$ (added) | 3.6 |

The boarder mol ratio of $Na_2O$ to $P_2O_5$ of from 1.6 to 2.8 corresponds to a weight ratio of $Na_2O$ to $P_2O_5$ of from 0.7 to 1.2.

The aqueous solution of phosphoric acid may be of any desired concentration. Advantageously, the concentration of the chemical compounds in the reaction product may be around 20%. Since sodium compounds other than the carbonate (e. g. the bicarbonate, hydroxide etc.) react with phosphoric acid (as well as other acid phosphate compounds) to produce reaction products having an $Na_2O/P_2O_5$ mol ratio of from 1.6 to 2.8, such other sodium compounds and acid phosphate compounds are within the principle of the invention, and "sodium carbonate" and "phosphoric acid" in the appended claims are intended to include such obvious equivalents. Similarly, potassium compounds may be substituted in whole or in part for equivalent sodium compounds without departing from the principles of the invention.

The phosphate rock may be any of the usual commercial products of a phosphate rock mill or concentrator. Excellent results have been obtained in the practice of the invention on a commercial scale with washer plant screen product (mostly—i. e. at least 90%—minus 6 mesh and plus 28 mesh) and with belt or table-type flotation concentrate (mostly minus 10 mesh and plus 65 mesh). The particle size of the rock is not especially critical, and a larger proportion of fine particle size material may be included in the calcining charge, as contrasted with other defluorinating processes in which rock of fine particle size is troublesome. Thus, in practicing the invention, it is possible to include in the calcining charge substantial amounts of froth flotation concentrate (mostly minus 20 mesh and plus 150 mesh), and plant concentrate (combined belt and froth flotation concentrates, mostly minus 14 mesh and plus 150 mesh). Generally speaking, it is desirable in defluorinating processes in which phosphoric acid is included in the calcining charge to use as much fine particle size rock as possible, and the possibility of doing so is an advantage of the invention. It has been found that a coarse feed (e. g. washer plant screen product) is usually discharged from a rotary kiln with a finer particle size than the feed, while a fine feed (e. g. froth flotation concentrate) is usually discharged with a coarser particle size than the feed.

Calcination is most conveniently carried out in a rotary kiln, although other types of calcining equipment may be used. Calcination is conducted in the presence of water vapor, care being exercised to assure intimate and continuous association of water vapor with the entire body of the charge until substantially complete defluorination is effected. The calcining temperature should ultimately be sufficiently high to eliminate substantially all of the fluorine and to impart high fertilizer availability to the phosphate content of the calcined product, and to this end should be at least 2600° F. and may be as high as 2800° F. Calcination is carried out in the absence of substantial fusion or sintering of the charge. A detention period of 10 to 20 minutes at approximately the ultimate calcining temperature, e. g. the hot zone of a rotary kiln, is sufficient to substantially defluorinate the rock and impart high fertilizer availability to its phosphate content.

In a rotary kiln, the depth of charge should be such as to insure adequate penetration of water vapor and escape of evolved fluorine. Too deep a bed of charge impairs these requirements and results in poor defluorination. Where calcination is carried out in a single pass through a rotary kiln 6 to 8 feet in diameter and 120 to 180 feet in length, rotating at a speed of from 20 to 50 seconds per revolution, a feed rate of 1 to 3 tons per hour gives a satisfactory depth of charge for effective defluorination.

Calcination may be carried out in two stages. The first stage, for convenience called the calcining burn, may be carried out in a relatively short rotary kiln, e. g. 60 feet, at a temperature of 2000–2500° F. with a rate of feed up to 20 tons per hour. The second stage, for convenience called the defluorinating burn, may then be carried out in a much longer kiln, e. g. 140 feet, at a temperature of 2600–2800° F. with a feed rate up to 5 tons per hour.

The following example illustrates a practice of the invention on a commercial scale in a rotary kiln 160 feet long and 6 feet in diameter, with a pitch of ⅜ inch per foot and a kiln speed of about 1 revolution in 25 seconds, a feed rate of about 1.8 tons per hour, and a hot zone temperature of approximately 2730° F. Calcination was conducted in one stage, that is in a single pass through the kiln. The phosphate rock was an unground plant concentrate and was fed wet (about 11% H₂O) to the feed chute at the cold end of the kiln. The reagent mixture (reaction product of sodium carbonate and aqueous solution of phosphoric acid) was fed to the feed chute along with the rock and sufficient additional water to give a slurry of the mixed rock and reagent mixture containing about 35% of water. About 1.4 tons of calcine was discharged from the kiln per hour. About 3 gallons of water was sprayed per minute onto the hot clinker at a point from 3 to 5 feet from the discharge (hot) end of the kiln. Average chemical and screen analyses of the rock were as follows:

*Chemical analysis*

| P₂O₅ | Insol. | CaO | F |
|---|---|---|---|
| Percent 34.55 | Percent 3.5 | Percent 49.77 | Percent 3.96 |

*Screen analysis*

| +35 mesh | −35+100 | −100 |
|---|---|---|
| Percent 29.3 | Percent 64.7 | Percent 5.7 |

The weight ratio of Na₂O to P₂O₅ in the reaction product was approximately 1, and the calcining charge was the mixture of rock and reaction product in the proportions by weight of about 92.5% rock (on a dry basis) and about 7.5% of added Na₂O and P₂O₅ (derived from the reaction product). The calcining charge (feed) had the following average analysis and molar formula:

| P₂O₅ | Insol. | CaO | Na₂O | F |
|---|---|---|---|---|
| Percent 35.75 | Percent 3.15 | Percent 44.77 | Percent 3.64 | Percent 3.56 |

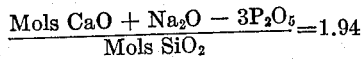

$$\frac{\text{Mols CaO} + \text{Na}_2\text{O} - 3\text{P}_2\text{O}_5}{\text{Mols SiO}_2} = 1.94$$

The calcine or clinker had the following average analysis:

| P₂O₅ | SiO₂ | CaO | Na₂O | F |
|---|---|---|---|---|
| Percent 39.31 | Percent 3.40 | Percent 49.22 | Percent 3.90 | Percent 0.15 |

The P₂O₅ availables of the calcine or clinker were as follows:

| 0.4% HCl | 2% citric acid | Neutral ammonium citrate |
|---|---|---|
| Percent 38.88 | Percent 36.05 | Percent 35.69 |

The following example illustrates a practice of the invention on a commercial scale in which calcination was carried out in two stages, that is in two passes through a rotary kiln. The first pass was through a rotary kiln 140 feet long and 8 feet in diameter. This kiln was much longer than required, or desirable, but was the only one available at the time of the run. The second pass was through the rotary kiln (160 feet long and 6 feet in diameter) hereinbefore described in connection with the preceding example. The calcining charge, on a weight basis, was made up as follows:

| | Percent |
|---|---|
| Phosphate rock (unground plant concentrate) | 92.42 |
| Na₂O (added in reaction product) | 3.68 |
| P₂O₅ (added in reaction product) | 3.90 |

The rock and reaction product were fed to the kiln, for the first pass, in the manner hereinbefore described in connection with the preceding example, the slurry containing about 30% of water. The average calcining temperature of the first pass was 2300° F. The average rate of feed was 11.5 tons of rock per hour, and the average rate of clinker discharge was 10.3 tons per hour. The recovery of phosphate in the clinker averaged 89.6%. The chemical and screen analyses were as follows, the molar formula ratio of the calculated feed being 1.68.

*Chemical analyses*

|  | $P_2O_5$ | Insol. | $SiO_2$ | CaO | $Na_2O$ | Fe and Al | F |
|---|---|---|---|---|---|---|---|
| Phosphate rock percent | 35.48 | 4.16 | ------ | 49.88 | ------ | 1.75 | 3.95 |
| Calculated feed do | 36.69 | 3.84 | ------ | 46.10 | 3.68 | 1.62 | 3.65 |
| First pass clinker do | 38.25 | ------ | 4.32 | 49.90 | 3.51 | 2.02 | 3.17 |

*Screen analyses*

| Phosphate rock | | | First pass clinker | | |
|---|---|---|---|---|---|
| +35 mesh | −35+100 | −100 | +3 mesh | −3+20 | −20 |
| Percent 24.7 | Percent 68.5 | Percent 6.8 | Percent 31.6 | Percent 19.3 | Percent 49.1 |

The cakes and lumps of the first pass clinker were crushed to mostly minus ¼ inch (3 mesh), and the crushed clinker was fed dry, in the second pass, at an average rate of 2.80 tons per hour. The clinker or final calcine discharge was at the average rate of 2.34 tons per hour, and the recovery of phosphate in the clinker averaged 83.6%. The average calcining temperature of the second pass was 2731° F. The screen analysis of the crushed clinker (feed), the chemical analyses of the feed and final calcine, and the $P_2O_5$ availables of the final calcine were as follows:

*Screen analysis of feed*

| +3 mesh | −3+20 | −20 |
|---|---|---|
| Percent 7.6 | Percent 29.0 | Percent 73.4 |

*Chemical analyses*

|  | $P_2O_5$ | $SiO_2$ | CaO | $Na_2O$ | Fe and Al | F |
|---|---|---|---|---|---|---|
| Feed percent | 38.25 | 4.32 | 49.90 | 3.51 | 2.02 | 3.17 |
| Final calcine do | 39.09 | 4.47 | 51.00 | 3.49 | 2.47 | 0.25 |

*$P_2O_5$ availables of final calcine*

| 0.4% HCl | 2% citric acid | Neutral ammonium citrate |
|---|---|---|
| Percent 38.39 | Percent 34.36 | Percent 34.01 |

The principal advantage of carrying out the calcination in two passes is that the soft cakes and lumps, which are formed at the relatively low temperature of the first pass, are easily broken down by mechanical crushers before going to the second pass where the temperature employed would otherwise cause the cakes and lumps to fuse or glaze to such a degree that satisfactory defluorination cannot take place. Once these cakes and lumps are broken down they have little tendency to reform, consequently a higher feed rate can be employed in the second pass than in a single stage operation in the same kiln. The increased output results in a lower unit cost of the finished product. Since the first pass greatly reduces the tendency of the charge to form or reform cakes and lumps, the operation in the second pass, which is the defluorinating burn, is much smoother. In other words, most of the operating difficulties are confined to the first pass or calcining burn, where their deleterious effects are of small if any practical significance, and the critical second pass or defluorinating burn may consequently be carried out with almost complete freedom from operating difficulties.

In practicing the invention on run-of-mine rock of fairly constant grade (i. e. $P_2O_5$ content), it is usually more convenient and practical to determine the composition of the reagent mixture on the basis of the insol. (silica) content of the rock, rather than on the basis of the aforementioned molar formula. Thus, with a phosphate rock running around 35% $P_2O_5$ (say 33 to 36% $P_2O_5$), the composition of the reagent mixture can readily be determined from the following table on the basis of the insol. content of the rock:

| Percent insol. | Broad range | | Preferred range | |
|---|---|---|---|---|
|  | Weight ratio, $Na_2O/P_2O_5$ | Mol ratio, $Na_2O/P_2O_5$ | Weight ratio, $Na_2O/P_2O_5$ | Mol ratio, $Na_2O/P_2O_5$ |
| 2.0–3.0 | 0.70–1.00 | 1.60–2.30 | 0.83–0.96 | 1.90–2.20 |
| 3.0–4.0 | 0.76–1.07 | 1.75–2.45 | 0.87–1.00 | 2.00–2.30 |
| 4.0–5.0 | 0.83–1.14 | 1.90–2.60 | 0.92–1.05 | 2.10–2.40 |
| 5.0–6.0 | 0.90–1.20 | 2.05–2.75 | 0.96–1.09 | 2.20–2.50 |

It will be seen that as the silica (insol.) content of the rock increases from 2 to 6%, the preferred mol ratio of $Na_2O/P_2O_5$ increases from 1.90 to 2.50; an increase of 0.15 for each increase of 1% in the silica content of the rock. For the ratio to thus increase, the $P_2O_5$ (in the reagent mixture) must decrease in relation to the $Na_2O$, and this decrease in $P_2O_5$ will be proportional to the increase in silica content of the rock. Thus, in making up the reagent mixture from the foregoing table it is possible to avoid too greatly deviating from the characteristic molar formula of the invention.

Where the silica (insol.) content of the run-of-mine rock (containing 33–36% $P_2O_5$) is also fairly constant, and less than 4%, the following table is conveniently used in practice to determine the $Na_2O/P_2O_5$ ratio of the reagent mixture, the amount of added $P_2O_5$ (in percent by weight on the combined weight of rock and added $P_2O_5$ and $Na_2O$) being determined to a large extent on the current availability of phosphoric acid, and being preferably between 5 and 6%.

| Percent of added $P_2O_5$ | $Na_2O/P_2O_5$ ratio by weight |
|---|---|
| 3.0 | 0.92 |
| 3.5 | 0.90 |
| 4.0 | 0.88 |
| 4.5 | 0.86 |
| 5.0 | 0.84 |
| 5.5 | 0.82 |
| 6.0 | 0.80 |

Where the silica content is below 4% (say 3–3.5%), it has been found from operating experience that as the added $P_2O_5$ is increased, the $Na_2O/P_2O_5$ ratio may be decreased, as indicated in the foregoing table. The currently desired $Na_2O/P_2O_5$ ratio of the reagent mixture is maintained by the plant analytical laboratory. The reagent mixture is mixed with the rock as hereinbefore described in connection with the examples, and in the proportion determined by the amount of added $P_2O_5$. Thus, with 5% of added $P_2O_5$, the added $Na_2O$ will be 4.2% and the balance of the calcining charge (90.8%) will be phosphate rock.

Throughout this specification and the appended claims, sizing is expressed in terms of Tyler standard screen-scale sieves, and "without substantial fusion" means in the absence of such fusion or sintering as to cause the charge to become sticky, in whole or in part, and tend to cling or stick to the wall of the calcining apparatus, and, in a rotary kiln, to ball-up and to fail to flow freely and easily through the kiln. By "substantially defluorinated" is meant a phosphate product containing less than 1 part of fluorine per 40 parts of phosphorus. The proportioning of the phosphate rock and reagent mixture in making up the calcining charge, herein variously specified, is to be understood as applying to the charge as initially fed to the calcining apparatus.

We claim:

1. The method of defluorinating phosphate rock which comprises subjecting the rock with a silica content not exceeding 6% to calcination at a temperature of at least 2600° F. without substantial fusion in the presence of water vapor and of a reagent mixture consisting essentially of the reaction product of sodium carbonate and phosphoric acid, the mol ratio of the $Na_2O$ to $P_2O_5$ content of the reaction product being between 1.6 and 2.8, and the CaO, $Na_2O$, $P_2O_5$ and $SiO_2$ content of the combined phosphate rock and reagent mixture being such that the mol ratio of these constituents in the formula $$\frac{\text{Mols } CaO + Na_2O - 3P_2O_5}{\text{Mols } SiO_2}$$

is between 1.3 and 2.8, and maintaining the calcining charge at said calcining temperature for a sufficient period of time to produce a phosphate product having high fertilizer availability and containing less than one part of fluorine for each 40 parts of phosphorus.

2. The method of claim 1 in which the molar formula ratio is between 1.6 and 2.

3. The method of claim 2 in which the mol ratio of $Na_2O$ to $P_2O_5$ in the reaction product is about 2.3.

4. The method of claim 1 in which calcination of the phosphate rock and reagent mixture is carried out in two stages each without substantial fusion and in the presence of water vapor, the first stage of calcination is carried out at a temperature between 2000 and 2500° F., the clinker from the first stage of calcination is crushed to mostly minus 3 mesh, and the crushed clinker is subjected to the second stage of calcination at a temperature of at least 2600° F.

References Cited in the file of this patent

UNITED STATES PATENTS

| | | |
|---|---|---|
| 1,058,249 | Meriwether | Apr. 8, 1913 |
| 2,093,176 | Tromel | Sept. 14, 1937 |
| 2,337,498 | Ritter | Dec. 21, 1943 |
| 2,442,969 | Butt | June 8, 1948 |
| 2,556,541 | Hollingsworth | June 12, 1951 |
| 2,562,718 | Hollingsworth | July 31, 1951 |

FOREIGN PATENTS

| | | |
|---|---|---|
| 453,646 | Great Britain | Sept. 11, 1936 |